United States Patent Office 3,526,094
Patented Sept. 1, 1970

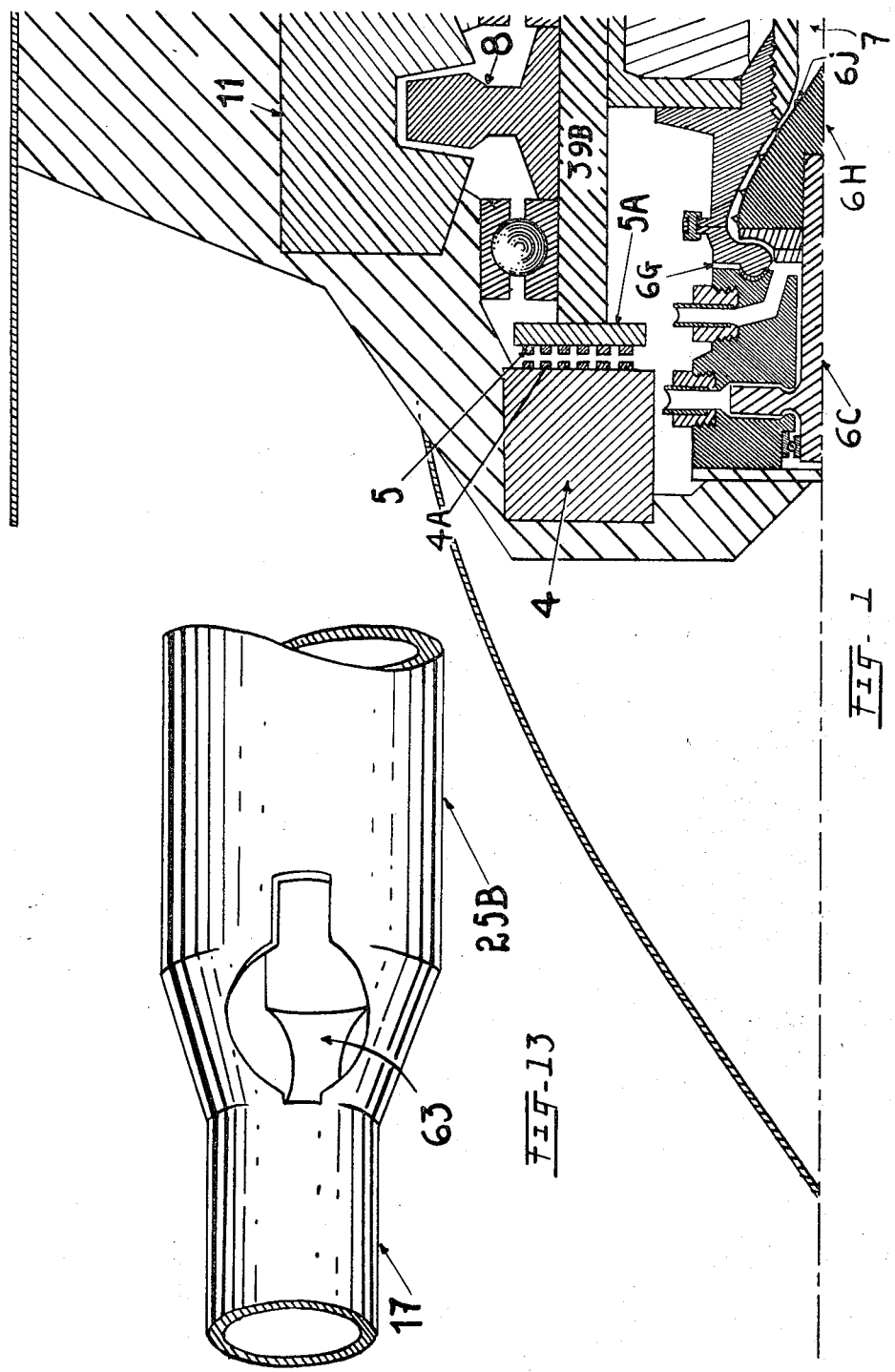

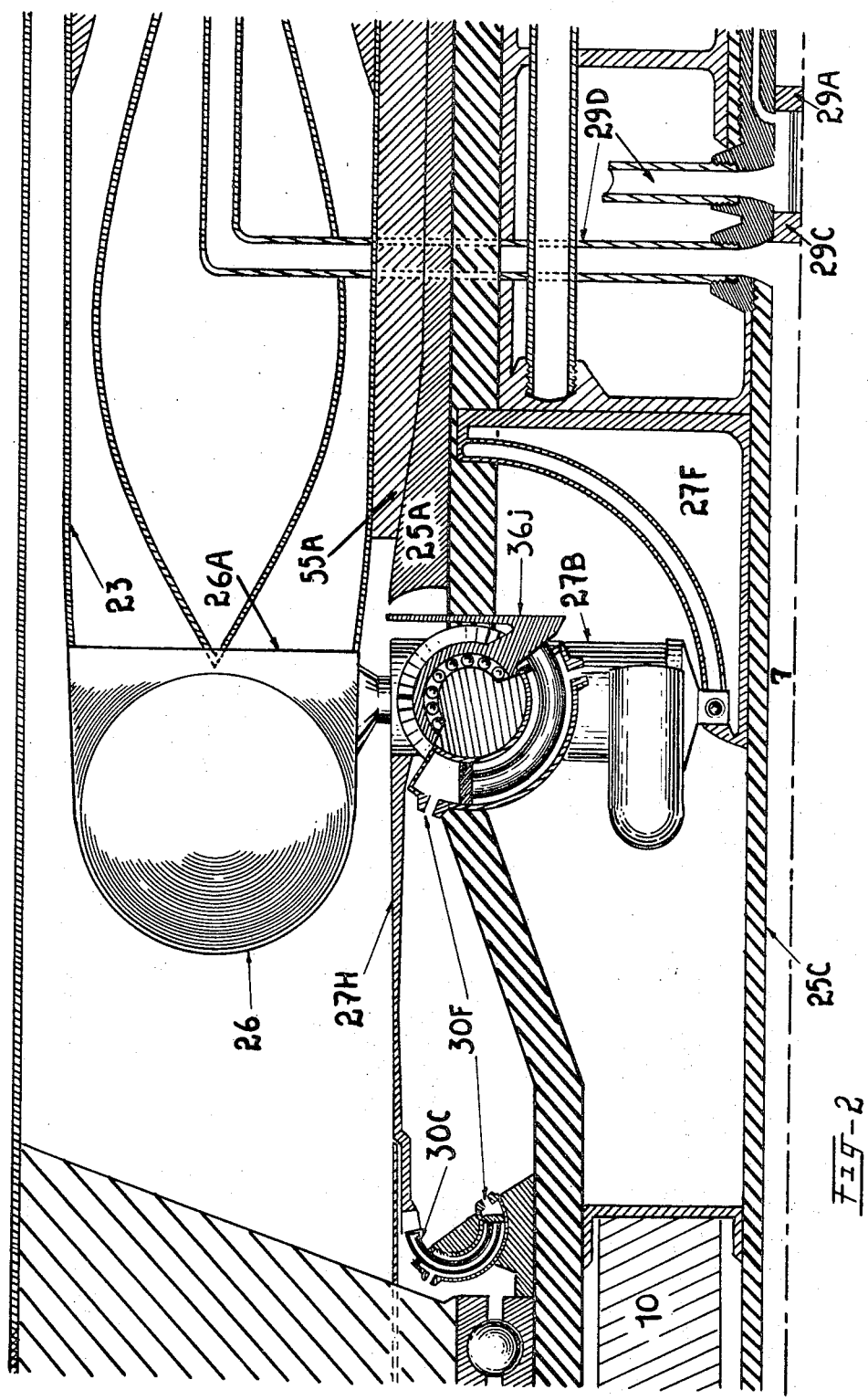

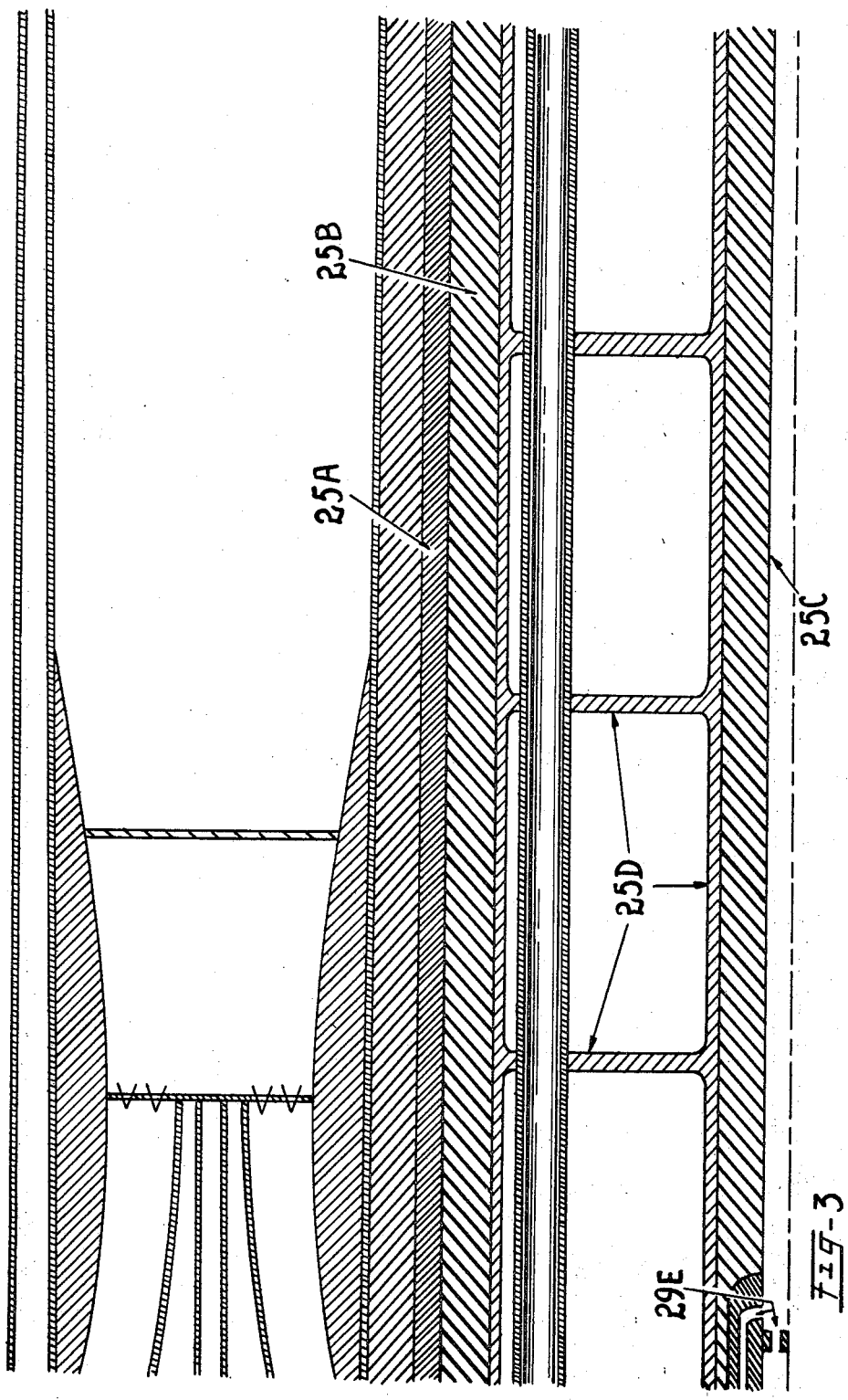

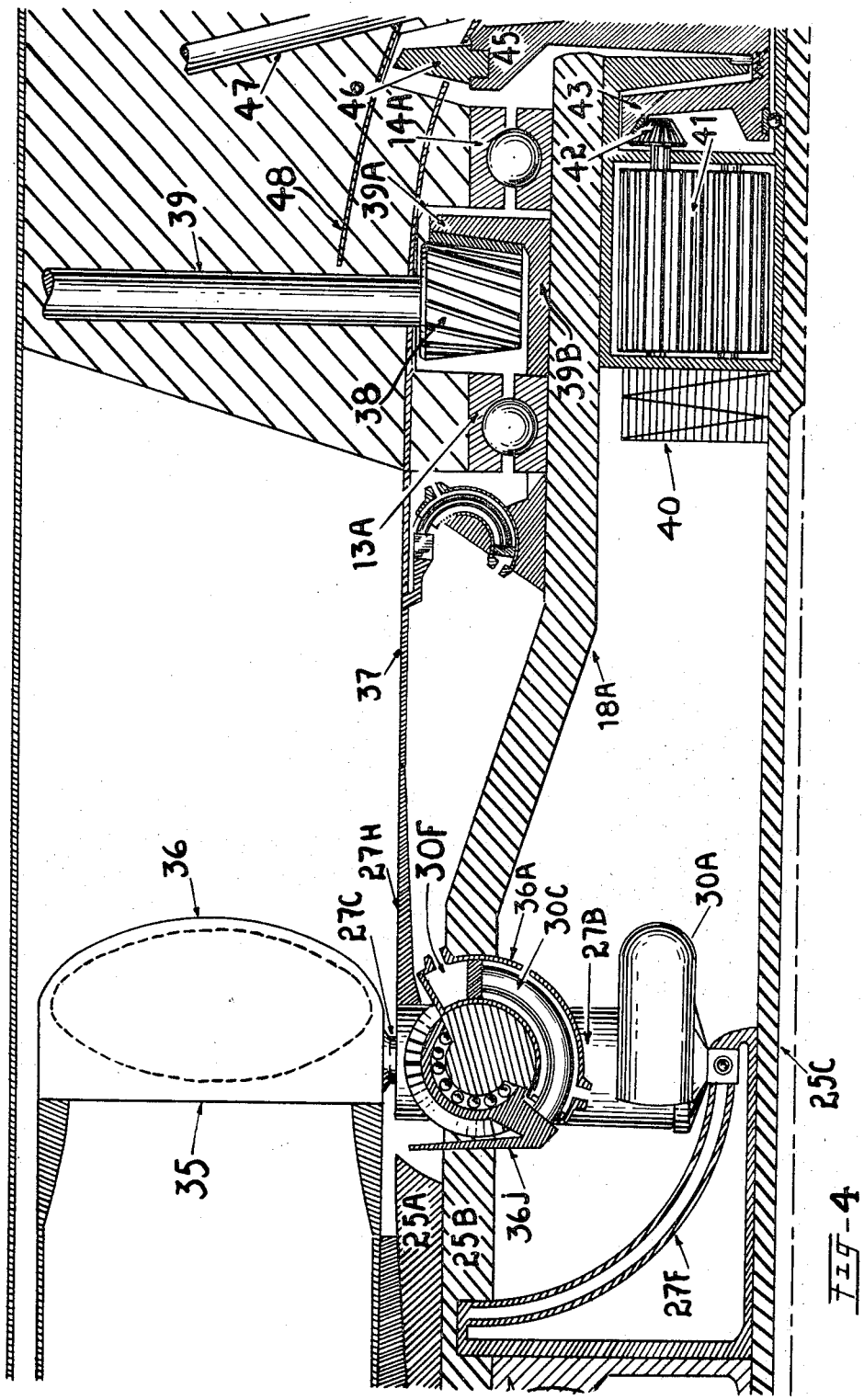

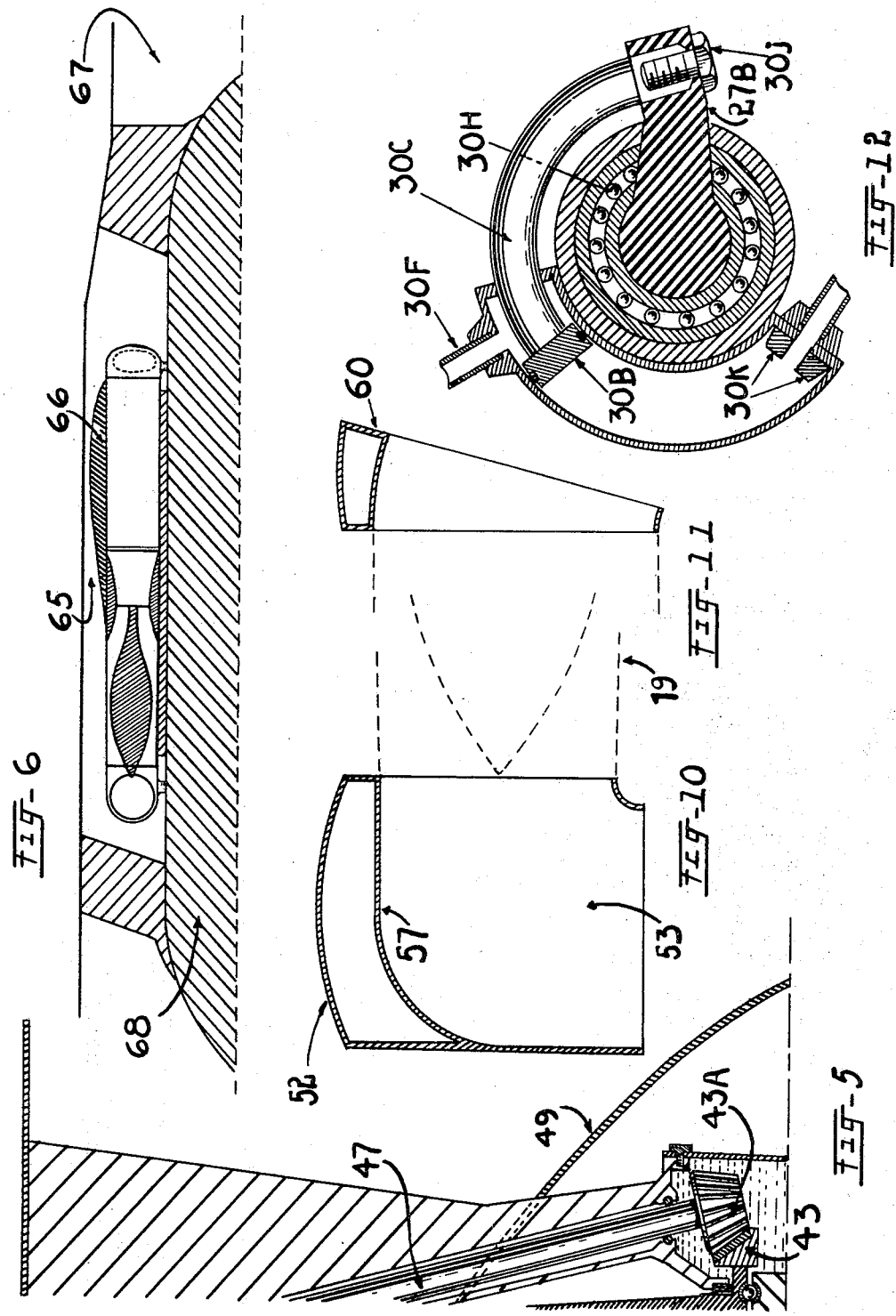

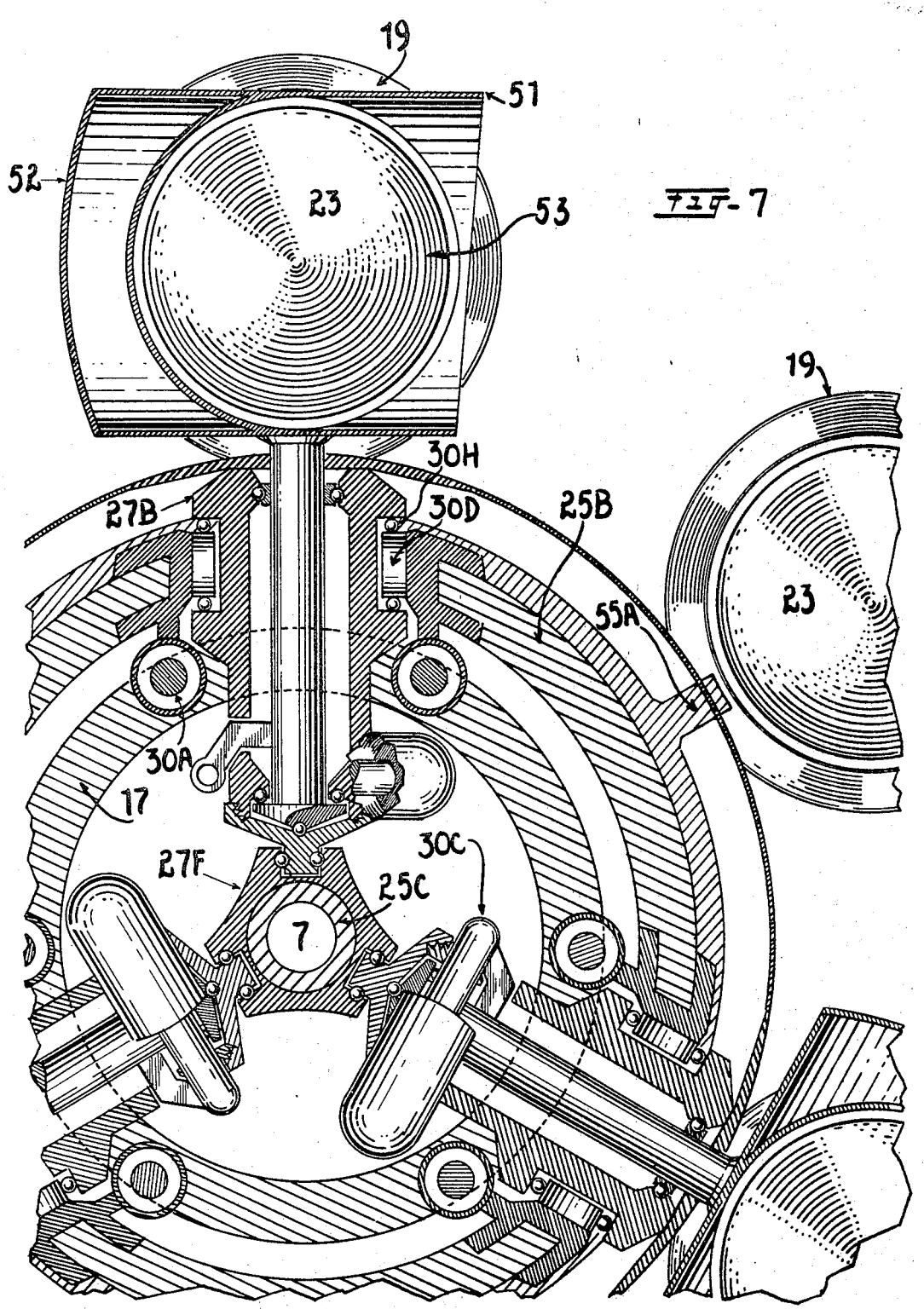

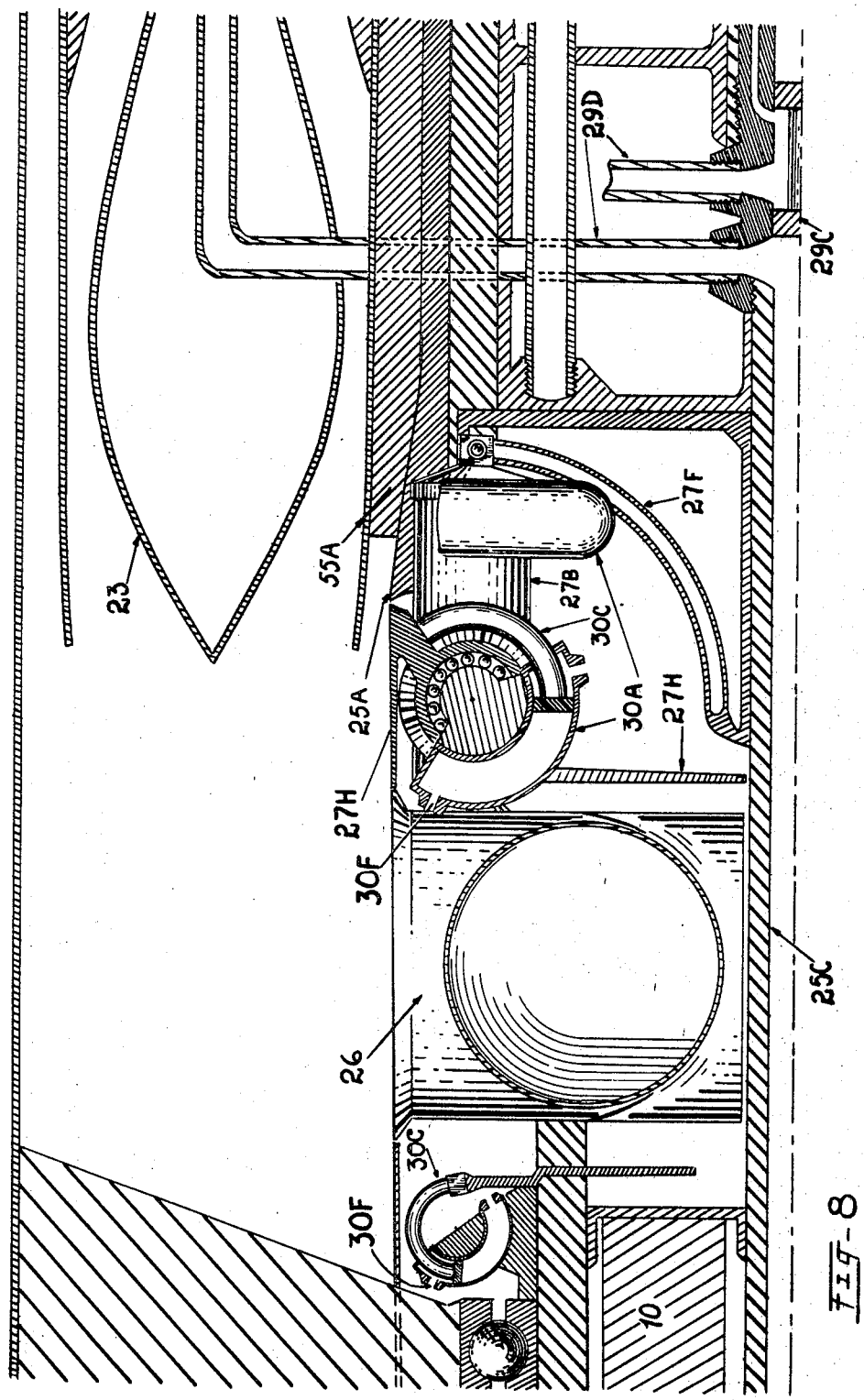

3,526,094
RAMJET ENGINE WITH RETRACTABLE LOW-SPEED DEFLECTORS
Jacques Tricand de la Goutte and Hugues Tricand de la Goutte, both of 3440 Bienvenue, Ville Brossard, South Gate, Quebec, Canada
Filed Dec. 14, 1967, Ser. No. 691,119
Int. Cl. F02k 7/10
U.S. Cl. 60—244                                                    4 Claims

ABSTRACT OF THE DISCLOSURE

A ramjet engine having a plurality of combustors mounted on a rotary carrier and retractable air and exhaust deflectors to permit operation at subsonic speed.

---

Figure 9:
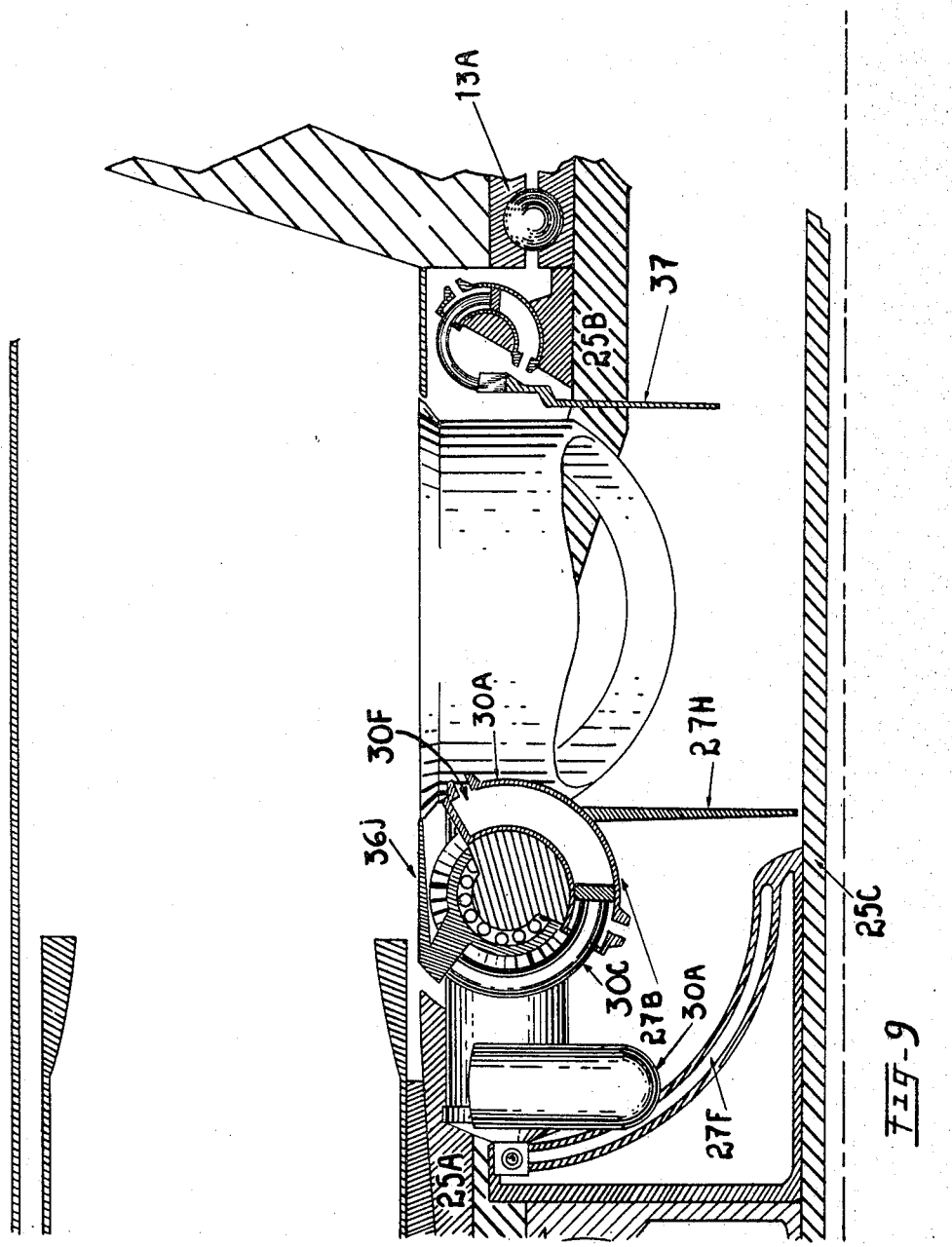

The present invention relates to a particular principle of jet motor consisting in a multi-rotary ramjets engine with devices for starting the ramjets at zero horizontal speed and controlling their operations. This principle is realized by a variable number of parallel and rotary ramjets whose certain are fitted with fore curved retracting air deflectors and aft curved retracting hot gases deflectors.

As to simplify our description, the following adjectives "deflected" and "non-deflected" will designate the rotary ramjets fitted with the above mentioned deflectors and those without any deflectors. Then, the parallel deflected and non-deflected rotary ramjets are peripherally mounted on a rotary cylinder or "carrier," whose axis is parallel to those of the ramjets. This group rotates inside an airduct having an air intake and an exhaust, and both engine's fore and aft bearings are fastened to the airduct by three fore sets of struts and three aft sets of struts, each one with streamlined fairings. The fore apertures of the fore rotary deflectors and the aft deflectors' exhausts are oriented in reverse directions.

When the starter makes rotate the ramjets carrier, the effect of the fast circular motion constrains the outer air to pass through the curved air deflectors, then around the ramjets' diffusers. After the compressed air mixes up with the injected fuel and the mixture is electrically ignited in the combustion chambers.

Afterward, the hot gases escape toward the ramjets' nozzles, but passing through the aft curved retracting deflectors they compel the rotary ramjets carrier to rotate under the torque action or the vectors effect of the rectangle of forces and in the reverse direction of the hot gases flow.

The fore and the aft deflectors have two positions: upper and lower ones. In their upper position, the fore air deflectors tightly lean against the ramjets' air intakes and make with them an angle of 90 degrees.

In their upper position, the aft hot gases deflectors tightly lean against the ramjets' exhausts making with them an angle of at least 16 degrees. This small angle made by the aft curved deflectors with their rotary ramjets carrier's axis is sufficient to insure the starting of the ramjets and also the starting of the vehicle itself.

In their lower position, the fore and the aft retracting deflectors are embedded in the front and back parts of the streamlined cones of the multi-rotary ramjets carrier. An hydraulic power system electrically controlled insures the control of the deflectors operations altogether with the synchronizing of their different motions.

Then the carrier's rotation is sustained by the self-propelled rotary ramjets. In fact, for the inner aerodynamics of the rotary ramjets this rotation can be assimilated to a horizontal displacement. Thus giving to the rotary ramjets a relative speed regarding the surrounding air.

The calculations indicate that the starter drive insures the minimum speed of rotation to the rotary ramjets carrier in order to start the ramjets engine. This minimum speed is a sufficient number of revolutions per minute which is function of the engine's diameter as to obtain a relative air speed of 400 feet/second insuring inside the ramjets an air speed of at least 150 feet/second. Our engine's regimes of rotation permit not only the starting of the rotary ramjets, but in increasing even more the rotation one can obtain sufficient energetic values in order to get a powerful thrust insuring the take-off and the flight of the aircraft. And in order to augment the over-all efficiency and security of our engine's working the addition of the non-deflected rotary ramjets is then rendered necessary. One must note too that those non-deflected rotary ramjets greatly increase the thrust power of our motor, what is most important for the take-off and the general performances of our multi-rotary ramjets engine.

As a matter of fact, for the same number of revolutions per minute a large engine's diameter means a circular displacement in feet/second greater than for a smaller diameter. Then the amount of thrust will be function of the over-all diameter of the engine and the latter diameter will be too function of the ramjets' diameters.

For instance, we have computed an engine with an over-all diameter of 47.1 inches whose ramjets' diameters are of 9.7 inches. Of course, these data can be augmented. Computing our engine's performances has shown us that its maximum number of revolutions per minute permits to easily withstand the centrifugal forces exerted by its rotation. Our computations indicate also that an engine having three deflected rotary ramjets separated from each other by an angle of 120 degrees is best suited to run smoothly with a good balance. Our engine has been calculated in order to have six more rotary non-deflected ramjets fitted by pairs between each deflected rotary ramjet. Thus making between each ramjet an angle of 40 degrees. The six rotary non-deflected ramjets have the same dimensions as those of the deflected ramjets.

According to a larger over-all diameter one can install more ramjets. The over-all length of our engine is function of the usual ratio between the ramjet's length and its main diameter. In increasing the over-all diameter of the multi-rotary ramjets engine, the latter can be made of only rotary ramjets fitted with deflectors; this solution taken in order to lodge these deflectors inside the fore and the aft streamlined cones.

In the upper position of the deflectors high speeds of rotation can be sustained without any overloading of the engine. This being given the short durations of the starting operations of the multi-rotary ramjets motor. The same advantage occurs during the operations of slowing down the flight's speed or for the landing, for it will be required too some bursts of great acceleration of the engine's rotation for the braking effect given by an installation of a thrust reverser.

However our engine has been designed also in order to sustain long periods of non-stop rotation. After the aircraft's take-off, when its speed becomes steady and fast, the pilot or a servo-mechanism actuates the fore and aft retracting deflectors back in their lodgings. Operation controlled by the inner hydraulic power system master. Then the multi-rotary ramjets of our engine behave as do ordinary ramjets having no moving part in their thrusting power structures. In the process of slowing down the aircraft's speed, the rotary non-deflected ramjets will deliver less thrust, then they will become less controllable. That is why the rotary deflected ramjets with their deflectors up will permit to maintain a firm control over the engine and over the aircraft's speed of flight. For their rotation will give back to them their great reactive power.

At low speeds when the relative air speed will be insufficient to energize the non-deflected ramjets, the thrust due to the rotation of the deflected ramjets will authorize the control of the aircraft's flight until the end of the slow speed followed whether by a new acceleration or until the landing. At the back of the engine's shaft is fitted a turbine driven by the hot gases coming from the ramjet's exhausts; this device energizes all the accessories of the multi-rotary engine.

TECHNICAL DESCRIPTION

(1) Deflectors

In their positions up the fore and the aft deflectors 26 and 36 (FIGS. 2, 4) tightly lean against the fore 26A and aft 35 apertures (FIGS. 2, 4) of the ramjets 19. The oil pressure given by the inner hydraulic power system actuates their hinges' motors 30A (FIGS. 7, 12). These motors are mounted on both sides of the deflectors' trunnions 30D (FIG. 7). Then under the action of those motors the fore and the aft deflectors leave their upper positions and turn down of 90 degrees toward their lodgings 31 (FIG. 2) embedded in the fore and the aft ends of the rotary ramjets carrier.

In the same time, actuated by their hydraulic motors 30A mounted on their inner columns 27C (FIGS. 2, 7) the deflectors swivel of 90 degrees before entering into their lodgings. Then their back casings 52 (FIG. 7) come of level with the streamlined fore 1 and aft 49 cones (FIGS. 1, 2, 4, 5).

The fore and the aft deflectors are also maintained in their lower positions by the oil pressure insured by the inner hydraulic power system. During the double rotation of the fore and the aft deflectors, the bottom ends of their outer columns 27B (FIGS. 2, 7) slide upward between two semi-circular and parallel railings 27F (FIGS. 2, 4, 7, 8, 9). This in order to obtain a great stiffness as to withstand the lateral efforts due to the centrifugal forces exerted by the engine's rotation.

For more detailed explanation we refer to the FIG. 7 which is a front cross section of the fore deflectors with some perspective views. It shows the fore deflectors with their casing 51 (FIGS. 7, 10), their back casing 52, 60 for the rear deflector's back casing (FIG. 11), the air intake of the rotary ramjets respectively numbered 53 and 19.

One can see too the coupling link 55 connecting the deflected and the non-deflected rotary ramjets, the coupling link 55A fastening the rotary ramjets to the outer shaft 25A, the ramjets' diffusers cones 23, the central shaft 25C, the central fuel pipe 7, the deflectors' trunnions 30D, the deflectors' outer columns 27B, the trunnions' ball bearings 30H, the bottom outer and inner columns' ball bearings with the deflectors' hinges motors 30A having the same number as the swivel motors. Except for their different forms the aft deflectors have the same retracting, bending and swiveling mechanisms of the fore deflectors.

(2) Deflectors' lodgings

In their way in and out from their lodgings 31 and 31A (FIGS. 8, 9), the fore and the aft deflectors pass through the holes 63 (FIG. 13) disposed in both truncated conical parts 17 and 18A (FIGS. 2, 4) of the engine's shaft.

(3) Flaps' motions

As the deflectors begin to turn down the mobile flaps are synchronizingly actuated by their hinges' hydraulic motors 30A (FIGS. 2, 4, 7, 8, 9) made on the same pattern of the deflectors' motors but of smaller size. Under the oil pressure coming from the inlet-outlet 30F (FIGS. 2, 4, 8, 9, 12) the piston 30B (FIG. 12) and its connecting rod 30C (FIG. 12) push the flaps' trunnion's arm 36J (FIGS. 2, 4, 8, 9), then the flaps turn down until the deflectors are still in their lodgings. Afterward, the oil pressure now comes from the other inlet-outlet 30F (FIGS. 2, 4, 8, 9, 12) and actuates the back end of the piston pushing up the flaps into their upper positions. The fore end of the flaps are tightly leaned against the deflectors' back casings' edges Then the deflectors go back into their upper positions, followed by the flaps going to their upper position letting the swiveling deflectors going to their upper positions. After the deflectors' motions are ended, the flaps are now to their upper positions where due to the hydraulic pressure their fore ends tightly meet with the fore ends of the fixed deflectors' flaps 27H.

(4) Engine's rotary ramjets carrier

The rotary ramjets carrier is made of a main shaft 25B with an outer shaft 25A bearing the rotary ramjets, it expands from the fore truncated conical part 17 to the other truncated conical part 18A (FIGS. 2, 3, 4, 7, 8, 9, 13). Then the central shaft 25C has the same length as the main shaft whose fore half contains the central fuel pipe (FIGS. 1, 2, 7). Both outer and central shafts are tightly fitted altogether by the main shaft whose half parts are screwed at their center for assembling.

(5) Inner and outer hydraulic power systems

As both hydraulic power systems of our engine follow the usual working norms of this kind of energizing installation, it is needless to make a detailed description of their different manifolds and pipes. We only describe here the principal operations performed by both systems. The inner hydraulic system is mounted at the back end of the main shaft 25B, it is constituted of a variable number of oil pumps 41 (FIG. 4) forming the origin of the inner hydraulic power system. Driven by the hot gases operated turbine 45 (FIG. 4) whose bevel gear ring 43 (FIGS. 4, 5) meshes with the pumps' pinions 42 (FIG. 4), the pumps deliver the oil pressure insuring all the mechanical needs of the deflectors, flaps and other motors belonging to the inner system. The outer hydraulic power system (not shown) is too driven by the turbine 45; it is constituted of an oil tank, manifolds and pipes leading the oil pressure to the brake and locking catch systems, and also to the fuel pump's turbine 6C (FIG. 1. The hydraulic power masters (not shown) and the other components of the system are fitted on the outer airduct's wall. As usual, at the starting operations of the engine, both inner 10 (FIG. 2) and outer hydraulic power systems masters are synchronizingly actuated by the controls of the aircraft's cockpit.

(6) The hydraulic motors

The inner hydraulic power system energizes one type of hinges' motor (deflector, mobile flaps and deflectors' swivel mechanisms). It is made of a toric 30A cylinder with two inlet-outlet 30F (FIG. 12). Inside the cylinder moves a piston 30B with a connecting rod 30C (FIGS. 2, 4, 7, 8, 9, 12) linked to the trunnion's arm 30D (FIG. 7). The trunnion has a ball-bearing 30H (FIG. 7). The cylinder's tightness is insured by a sealing ring 30K (FIG. 12) and the trunnion's arm is fixed by a nut 30J (FIG. 12).

(7) Fuel pump

The fuel pump 6C, G, H, J (FIG. 1) provides fuel to the different deflected and non-deflected rotary ramjets of our engine. It is constituted of both fixed and rotary mechanisms. Operated by the outer hydraulic power system the oil turbine 6C (FIG. 1) rotates and drives the centrifugal pump 6G connected to the conical pump 6H fitted with a spiral rib 6J (FIG. 1). This pump revolves in the same direction as the multi-rotary ramjets engine.

(8) Fuel distributor

At the starting of the engine the fuel pump 6C, G, H, J fills the fuel distributor 29A, C, D, E (FIGS. 2, 3) insuring the fuelling of the non-deflected rotary ramjets burners. Then at a deferred time and according to the aircraft's speed, the fuel is injected in the above mentioned burners (not shown). The air speed is measured by a Pitot tube (not shown) fitted on the rotary ramjets carrier and connected to a pressure gauge (not shown) installed inside the hydraulic power system master (inner system). This gauge is set to a certain amount of air pressure which through the hydraulic master 10 (FIG. 2) actuates the fuel distributor. The aforesaid air pressure relates to a sufficient air speed insuring the conditions of ignition of the mixture air-fuel in the ramjets' combustion chambers.

As the oil pressure comes from the inlet-outlet 29B, the piston 29C pushes backward the other piston 29A (FIG. 2), then uncovering the pipe's aperture 29D, letting flow up the fuel. In the reverse operation the piston 29A blocks the pipe's aperture.

(9) Central fuel pipe

A central pipe conveys the fuel to the rotary ramjets, this pipe 7 (FIGS. 1, 2, 7), mounted inside the central shaft 25C the pipe's diameter is sufficient to insure the constant fuelling of the ramjets.

(10) Turbine

At the back end of the main shaft 29B is fitted a hot gases driven turbine 45 (FIG. 4) actuated by a minor part of the hot gases flow coming from the ramjet's exhausts. A hot gases duct 48 (FIG. 4) leads them toward the turbine's blades 46 (FIG. 4) thus compelling the turbine to rotate. After this operation, the hot gases mix up with the main flow escaping toward the airduct's exhaust. The turbine actuates the pumps of the inner hydraulic system and also the pumps of the outer hydraulic power system with the electric generator and other accessories of the engine by means of a bevel gear 43 (FIG. 5) meshing with another bevel gear 43A actuating a shaft 47 in order to drive the above mentioned accessories.

(11) Non-deflected rotary ramjets

The non-deflected rotary ramjets 19 (FIG. 7) have the same over-all dimensions and the same internal devices as the rotary deflected ramjets.

(12) Electrical connections rings

In order to insure the control over the different operations of the engine, an electrical connections outer ring 4 (FIG. 1) is installed near the fore end of the main shaft 17. Facing the latter ring an inner ring 5A receives and conveys the orders given by the pilot or by a servo-mechanism set up in the aircraft's cockpit. The contacts are insured by carbon contacts 4A for the outer ring and 5 for the inner ring (FIG. 1).

(13) The engine's lubrication

The engine's lubrication is insured by two systems. The first is constituted by a pump (not shown) driven by the turbine 45 and placed on the outer airduct's wall. An oil radiator 40 (FIG. 4) is connected to the oil manifold (not shown) and its cooling is insured by the outer air stream coming from the fore cone holes (not shown). The lubricated points are: fore and aft bearings with their ball bearings, hydraulic pumps bevel gears, turbine's ball bearings, starter's shaft 49 with its bevel gear and bevel gear ring, electric generator's shaft 47 (FIGS. 4, 5).

The second system insures the lubrication of the fore and the aft deflectors' hinges mechanisms and also the fore and the aft mobile flaps' hinges mechanisms. This by means of lubricating graphite filled ball-bearings and the deflectors' railings.

(14) Starting system

Under the action of an electric motor (not shown), the starter's shaft 49 and its bevel gear 38 (FIG. 4) rotate, thus driving the main shaft's bevel gear ring 39A (FIG. 4). This operation insures the rotation of the rotary ramjets carrier.

(15) Brake and locking catch systems

The brake's system insures the braking of the engine's loose rotation when the latter is no more needed. It is made of a disc 8 (FIG. 1) mounted between the first fore bearing and the second fore bearing (FIGS. 1, 2). Three brake's calipers are each fastened on each of the three fore sets of struts. The FIG. 1 shows one of them (No. 11), those calipers are hydraulically energized and their motors have inside their cylinders two opposite pistons each pushing a caliper's leg. The brake's disc 8 has peripheral and regular indentations (not shown); at the engine's back on the seating 39B of the starter's bevel gear ring 39A (FIG. 4) are disposed too peripheral and regular indentations (not shown). Two locking catches (not shown) are each mounted on only two aft sets of struts. Then hydraulically driven the fore and the aft locking catches mesh with the indentations of the disc 8 and of the bevel gear ring's seating 39B. Thus the engine is firmly locked in five points. For the reverse operations, both brake and locking catch systems release their grip, setting the engine free to rotate. Both above systems are energized by the outer hydraulic power system and controlled by its master.

(16) Cooling system

A circulation of liquid air, Freon or other ultra-coolant can be provided in order to insure an adequate cooling of the hot points of the engine as the aft deflectors' hinges mechanisms and the aft flaps' hinges mechanisms. This by means of a pump driven by the turbine 45 and fitted on the outer airduct's wall. The internal cooling of the main shaft 25B and of the various inner devices (deflectors' mechanisms, flaps' mechanisms and the oil radiator 40) is insured by an air circulation coming from three holes (not shown) disposed in the fore cone 1 (FIG. 1) and going through the main shaft's five compartments 25D, (FIGS. 2, 3). Then escaping through three holes (not shown) of the aft cone 49 (FIG. 5), this air mixes up with the exhaust's hot gases. According to the various flight conditions each of the fore and the aft cone's holes can be closed or opened by an hydraulically driven door (not shown). Under the action of the hydraulic master 10 this system permits the control over the internal temperature of the engine. During the flight, the cold air passes through the airduct, then cooling the rotary ramjets. In the same time, owing to the ramjets high temperatures this air expands and then mixes up with the hot gases flow, thus adding its thrust to the multi-rotary ramjets engine. (See paragraphs 17.)

(17) Cooling air's thrust power

The fact that the incoming outer air becomes hot in the process of cooling the rotary ramjets has led us to utilize it as a new source of thrust. Referring to the FIG. 6, we see that each one of the rotary ramjets is made of a double housing having an upper part 66 whose the lower one is itself the ramjet's upper casing. The upper housing 66 presents the following characteristics: from the ⅔ of the rotary ramjet this upper housing is a progressive sloping up wall ending just before the ramjet's exhaust. This housing is in fact a fixed air compressor, whose top with the inner airduct's wall constitute a converging duct 65 which due to its speed the incoming hot air is highly compressed. Afterward, owing to the diverging duct the hot air expands, thus delivering its thrust with a ramjet's effect.

The mounting of the double housing is realized by the concentric and truncated conical casing 66 fitted around the rotary ramjets' upper casings, and both housings are linked altogether by two railings (not shown). The superior railing fitted on the inner side of the housing 66 has the same form and the inferior is fitted on the outer part of the upper ramjet's casing. Both railings meet at both ends of the two housings as shown in FIG. 6. The spaces between the ramjets (not shown) have their back apertures (not shown) narrower than their forward ones (not shown), then each one constitutes also a fixed air compressor, as does the converging duct 65. Passing along the hot rotary ramjets fastened on their rotary carrier 68, the incoming outer air heats itself and is highly compressed in the converging ducts before giving its thrust. We note that all the fixed air compressors bring to the engine not only their reactive power, but if there is an after-burner, they constitute also a source of air. The FIG. 6 shows the mounting of an after-burner installation 67 on the rotary ramjets' general exhaust.

(18) After-burner

As the multi-rotary ramjets carrier 67 (FIG. 6) rotates inside its cylindrical airduct, this device permits the optional mounting of an after-burner 67 on the end of the airduct's exhaust. The peripheral and parallel disposition of the rotary ramjets of our engine is in fact an addition of exhausts. Thus acting as a single engine's exhaust with the usual thermodynamics of the hot gases flow escaping toward the atmosphere. Whence the idea of fitting an after-burner installation on our engine with its corollary devices of fuel and water injections. Furthermore, the hot air expanding from the diverging ducts has two levels of action. The upper one coming from the converging ducts 65 cools the engine's and the after-burner's inner walls, then it mixes up with the hot gases rushing from the ramjets' exhausts. The second level hot air mixes up with the ramjets' hot gases.

What we claim is:

1. A reaction engine operable over subsonic and supersonic flight speeds comprising a casing defining an air intake and an exhaust nozzle, a rotary carrier mounted for rotation in said casing, a plurality of ramjet combustors mounted around the periphery of said carrier, the axes of said combustors being parallel to the rotational axis of said carrier, means for supplying fuel to said combustors, and means to permit operation of the engine at low subsonic flight speeds, said last mentioned means comprising retractable air and hot gas deflectors mounted on said carrier for movement between a first, operative position in registry with at least one of said combustors and a second, inoperative position retracted out of the gas flow path through the engine, said air deflector being in the form of a scoop which forces air to said combustor, said hot gas deflectors having a surface directing the exhaust of said combustor substantially tangentially to said carrier to rotate said carrier.

2. A reaction engine as set forth in claim 1 wherein said deflectors are provided for fewer than the total number of said combustors.

3. A reaction engine as set forth in claim 1 wherein said deflectors are provided for each of said combustors.

4. A reaction engine as set forth in claim 1 wherein a convergent-divergent air bypass passage is defined between said combustors and said casing.

References Cited

UNITED STATES PATENTS

| | | | |
|---|---|---|---|
| 2,474,685 | 6/1949 | McCollum | 60—39.35 |
| 2,667,741 | 2/1954 | Price | 60—270 |
| 2,762,192 | 9/1956 | Ward | 60—39.35 |
| 2,832,192 | 4/1958 | Budish | 60—244 |
| 3,354,636 | 11/1967 | Utrup | 60—270 |
| 3,374,631 | 3/1968 | Marks | 60—244 |

DOUGLAS HART, Primary Examiner

U. S. Cl. X.R.

60—39.33, 262, 263, 270